United States Patent [19]
Marsh

[11] 3,775,011
[45] Nov. 27, 1973

[54] OPTICAL CONTROL MEANS

[75] Inventor: David Malcolm Marsh, Cambridge, England

[73] Assignee: T. I. (Group Services) Limited, Birmingham, England

[22] Filed: May 27, 1971

[21] Appl. No.: 147,595

[30] Foreign Application Priority Data
May 28, 1970 Great Britain.................. 25,658/70

[52] U.S. Cl................. 356/172, 356/152, 356/170, 250/219 DR, 250/220, 240/2 MT, 350/271, 350/274
[51] Int. Cl. ......................................... G01b 11/26
[58] Field of Search............. 250/219 DR, 219 WD, 250/222, 224; 356/164, 166, 170, 172, 152; 350/271, 273, 274; 240/2 MT

[56] References Cited
UNITED STATES PATENTS

| | | | |
|---|---|---|---|
| 2,791,931 | 5/1957 | Summerhayes, Jr. ........ | 250/219 WD |
| 3,093,742 | 6/1963 | Murphy...................... | 250/219 WD |
| 3,003,064 | 10/1961 | Astheimer.................. | 250/219 WD |

*Primary Examiner*—David Schonberg
*Assistant Examiner*—Paul K. Godwin
*Attorney*—Scrivener, Parker, Scrivener and Clarke

[57] ABSTRACT

Optical means for automatically controlling or monitoring the position of a relatively moving member such as a tool tip in an automatic machine tool. An image of the relatively moving member is projected onto a slit in an optical system and the slit is repeatedly scanned longitudinally. A photo-electric device such as a photomultiplier detects light passing through the slit and responds to a fall in light passing through the slit caused by the presence of the moving member. The photo-electric device is connected to an electric circuit which produces a signal to halt movement of the member when the photo-electric device responds to a fall in light. There may be two orthogonal slits in the optical system onto each of which an image of the moving member is projected, a photo-electric device being provided behind each slit. Thus the moving member can be brought to a fixed datum point.

7 Claims, 7 Drawing Figures

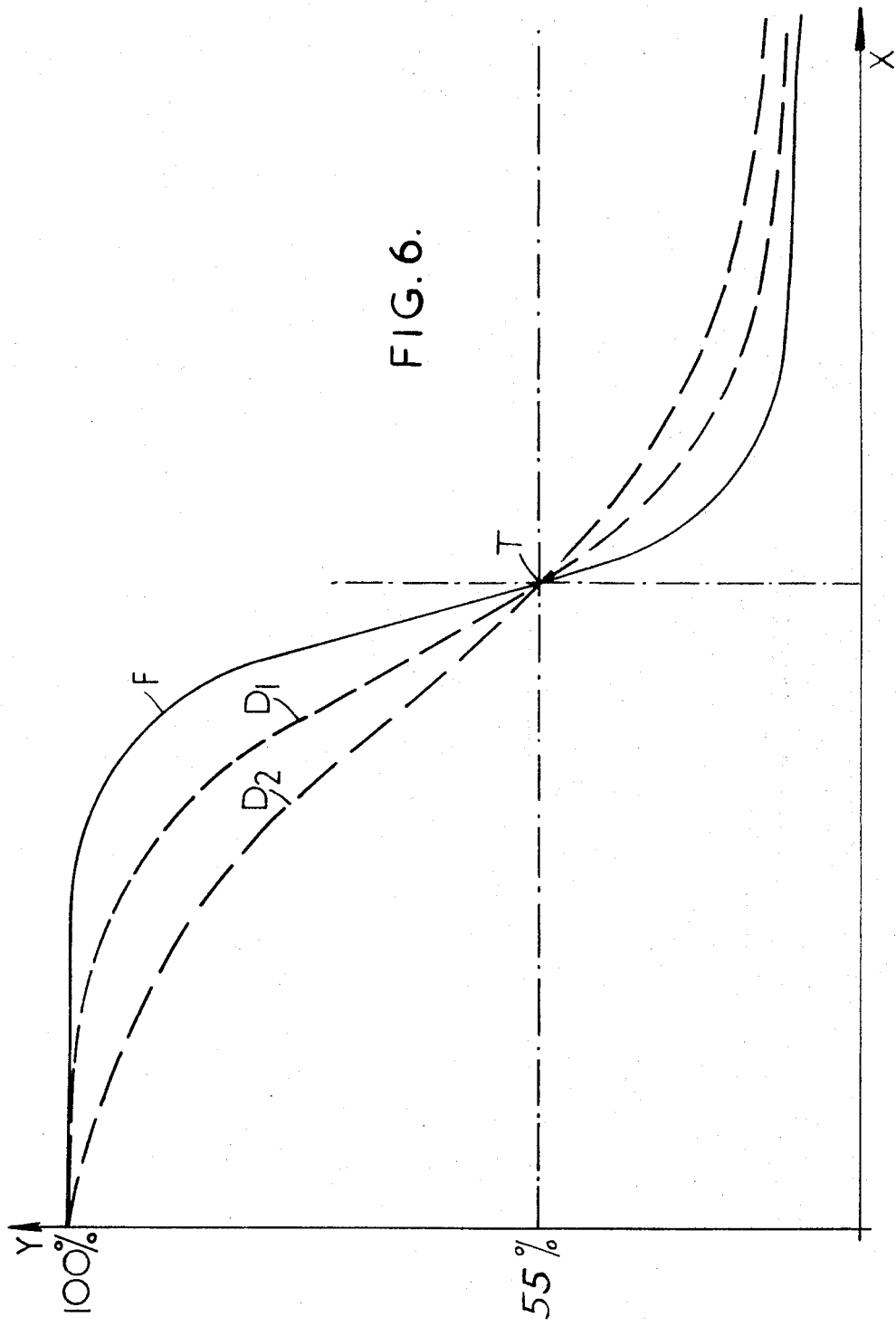

OPTICAL CONTROL MEANS

This invention relates to optical means for automatically controlling or monitoring the position of a movable member; it is of particular value in controlling the movement of tool-heads or slides in machine tools, but may find use in other fields.

In numerically controlled machine tools the position of the tool is controlled incrementally from a datum point in each of its directions of travel, by the counting of interference fringes or some similar method but some external means are required for setting the tool accurately to the datum point initially. This is because it is impossible, for practical reasons, to predetermine accurately the exact relative position of the cutting tip of the tool and its support, and so normally the tip of the tool is brought manually up to the fixed datum line before the numerical control takes over. This manual operation is done with an optical projector using a graticule as the reference point; it takes up valuable time and has to be repeated each time a tool is changed.

The aim of the present invention is therefore to provide means for setting a tool to a datum line or point automatically and quickly. According to the invention an image of a tool tip or other relatively moving component required to be brought to a datum line is caused to fall on a slit in an optical system and the slit is repeatedly scanned longitudinally, while a photo-electric device detects the light passing through the slit and responds to the change in light indicating the presence of the tip or other component. Normally the optical system will be stationary and the component will be the tip of a tool carried on a moving slide. The travel of the slide is automatically halted when the tool tip reaches the set datum line.

Preferably the method described is applied simultaneously in two mutually perpendicular directions of travel so that the tool is brought up to a fixed datum point, and according to a further feature of the invention the two control systems employ at least partially a common optical system. The halting of both the drives, indicating arrival at the datum point, can be used to initiate a cycle of machining operations under numerical control, in which the tool is first traversed from the datum point to a working position.

An embodiment of the invention will now be described by way of example only, with reference to and as shown in the accompanying drawings in which.

Figure 3:
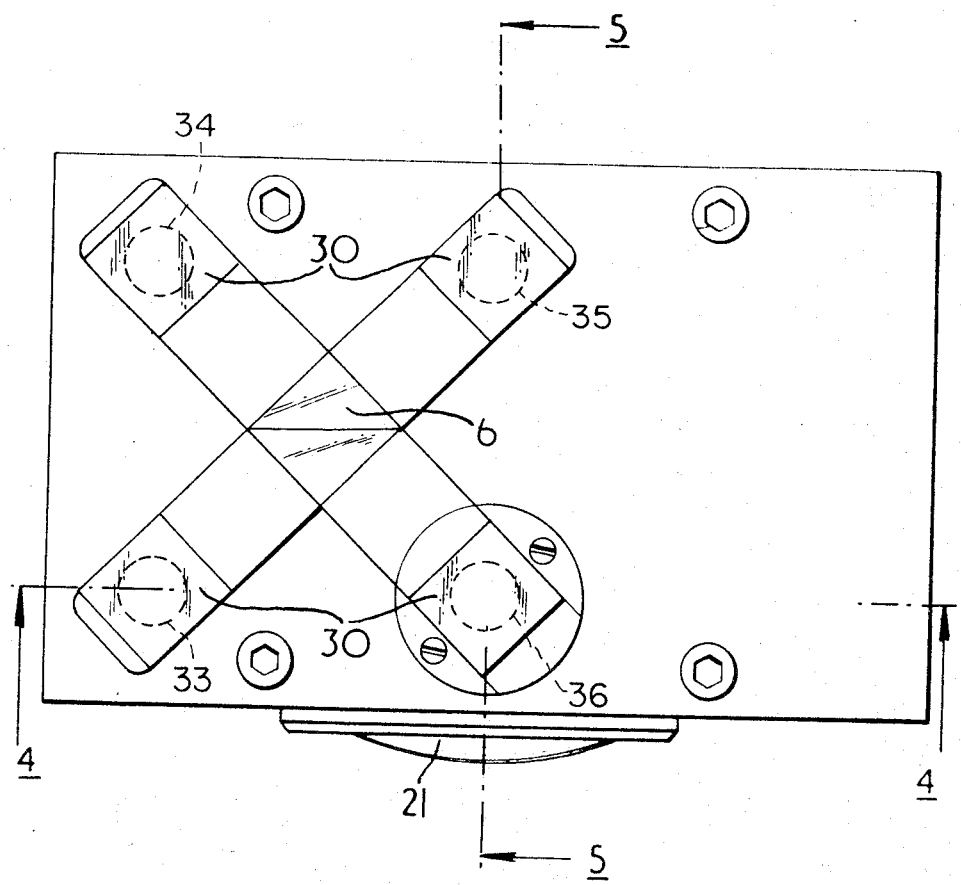
FIG. 3 is a plan view of the optical unit with its cover plate removed.
Figure 4:
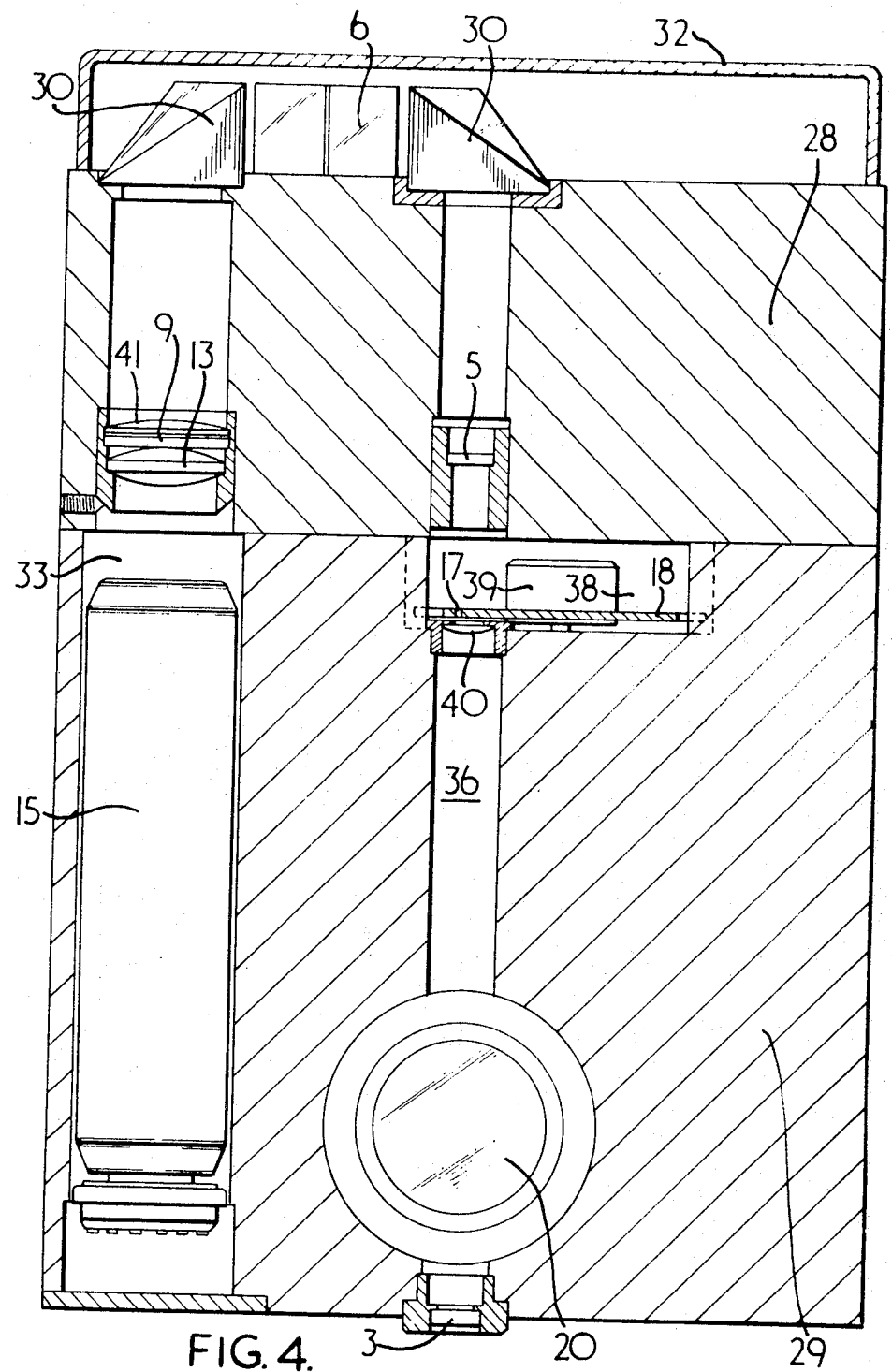
Figure 5:
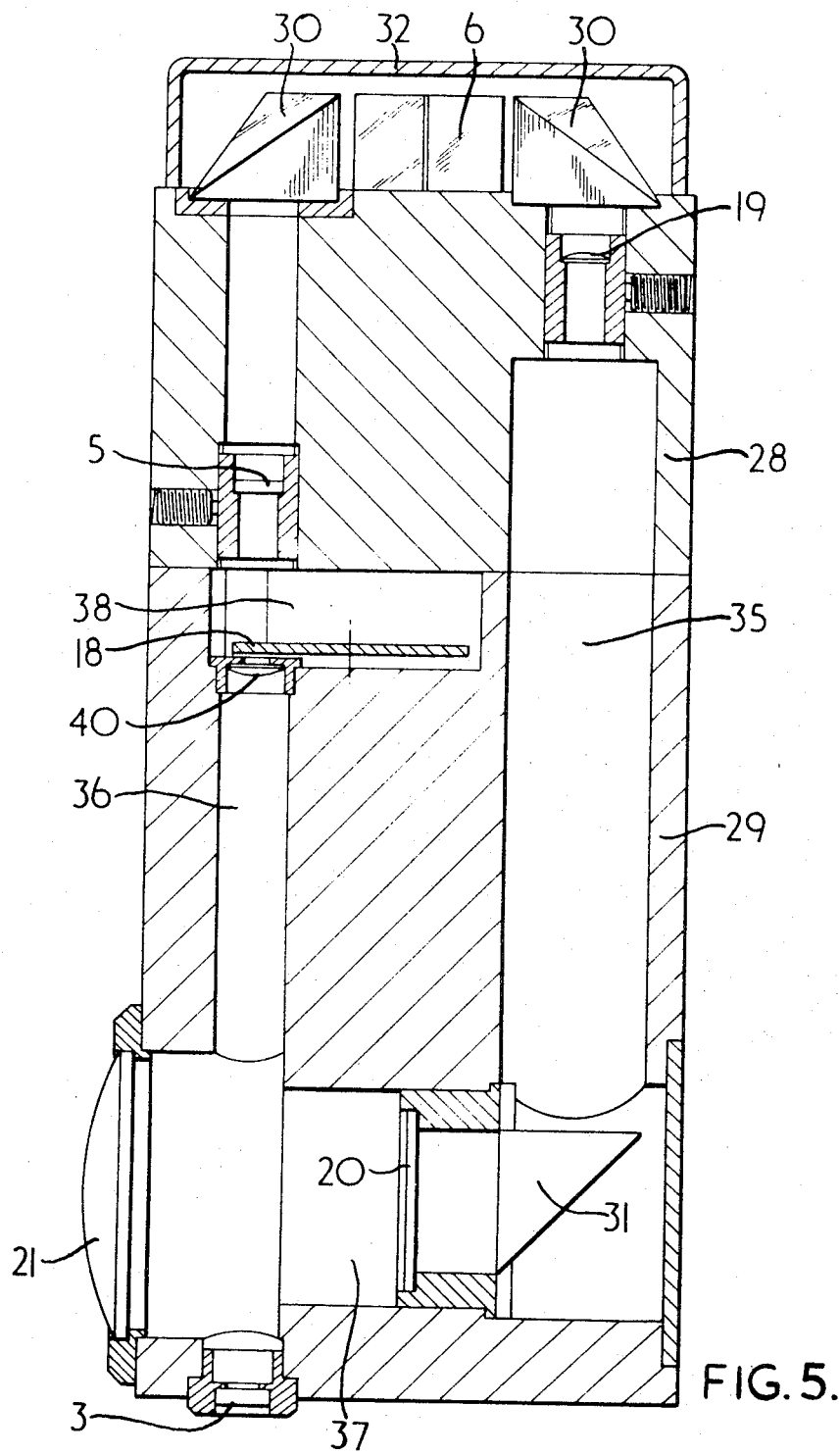

FIG. 4 and 5 are sectional views on lines 4—4 and 5—5 respectively in FIG. 3, and FIG. 6 is a graph showing the variation in light intensity received by the optical unit as a tool approaches the datum point.

Figure 7:
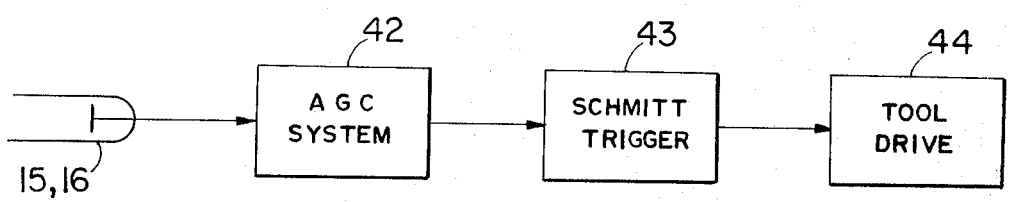

FIG. 7 is a block circuit diagram illustrating the circuit used to control movement in one of the two directions.

Figure 1:
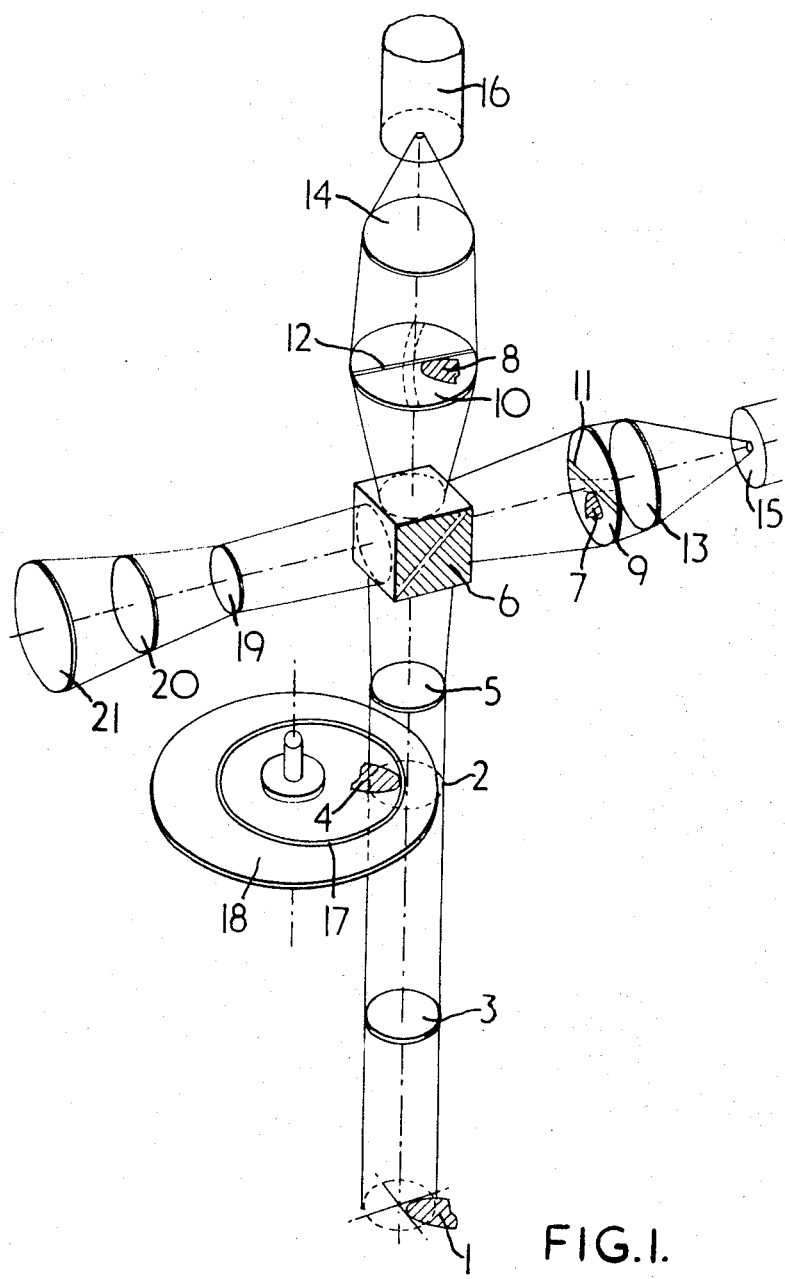
FIG. 1 is a schematic view of the arrangement of major optical components in the apparatus.

The arrangement of optical components in FIG. 1 is shown in relation to a tool tip which may for example be mounted in a numerically controlled lathe. The tool tip 1 is imaged onto a primary image plane 2 by a primary lens 3 and the image 4 is relayed to a secondary image plane by a relay lens 5. A cube prism 6 placed before the secondary image plane splits this image into two separate images 7 and 8 each lying on the surface of a graticule 9,10 carrying a straight slit 11,12. The slits 11,12 are arranged to appear perpendicular to each other when viewed from the tool tip 1 (thus providing a crosshair effect) and condenser lenses 13,14 behind each slit throw the light onto two separate photo-multipliers 15,16. Since the tool tip is liable to cover only a minute fraction of each slit 11,12 these must be scanned in such a manner that only a small proportion of each slit is examined at any one moment. This scanning is effected by a slit 17 in the form of a rotating eccentric ring in a rotating disc 18 in the primary image plane 2. One such ring slit scans both straight slits 11,12 since it is so disposed as to scan each straight slit at approximately 45°. The width of the ring slit 17 is relatively small compared with the minimum tool tip image radius so that tool tip radius effects can be ignored.

While the above system is sufficient to provide automatic control it is also desirable to have a visual check. For this reason the straight slit graticules 9,10 are etched in chromium which reflects much of the incident light back into the cube prism 5. Half of this reflected light appears in the fourth cardinal direction from the cube prism and is projected through a screen lens 19 to form a visual image on a screen 20 which can be viewed by a magnifying lens 21.

The optical layout described above has been simplified to clarify the principle of the system. The complete optical layout and the construction of the apparatus is shown in FIGS. 2 to 5 in which those optical components which are shown in FIG. 1 have the same reference numerals as in FIG. 1.

Figure 2:
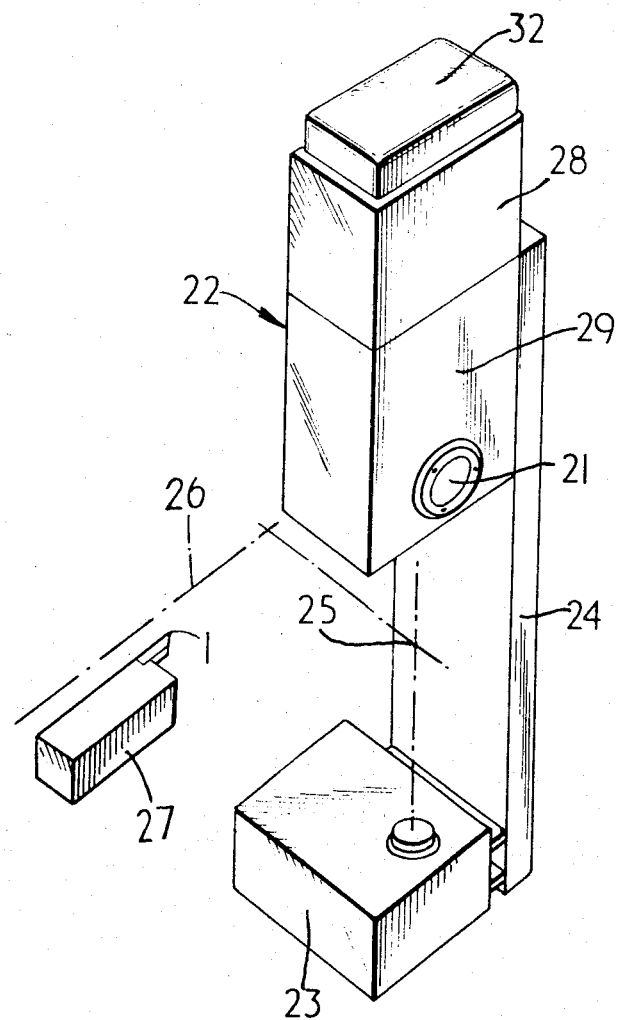
FIG. 2 is a pictorial view of the complete apparatus.

The apparatus comprises an optical unit 22 and a lamphouse 23 mounted at opposite ends of a backplate 24. The backplate 24 is rigidly mounted on the lathe in any suitable position in which the tool tip 1 can be moved by the normal movements of the lathe tool holder to set it at the datum point 25. One such position is illustrated in FIG. 2 in which 26 is the spindle axis of the lathe and the tool 27 is shown in a working position from which it can be traversed to set the tool tip 1 at the datum point. Thus the apparatus is clear of the tool 27 during operation of the lathe. Further clearance may be provided by mounting the backplate 24 on the ram of a hydraulic piston-and-cylinder unit (not shown) so that the apparatus can be withdrawn from the working area when not in use, the ram being provided with a stop to accurately position the apparatus when in use. Alternative means of moving the apparatus away from the working area may be used.

The optical unit 22 comprises a pair of solid blocks 28,29 of for example an aluminum alloy, the optical system being mounted in a number of holes drilled in the blocks. The whole system is bent by prisms 30,31 so that the final construction is folded up and contained in relatively small blocks. The cube prism 6 is mounted under a cover 32 on top of the block 28, which is uppermost as viewed in FIG. 2, with four prisms 30 lying adjacent to the cube prism and aligned with each of its cardinal directions. The components lying along each cardinal direction of the cube prisms 6 can thus be housed in four parallel vertical holes 33,34,35,36 extending through the two blocks 28 and 29. An additional hole 37 is drilled horizontally through the lower block 29 near its lower end. The horizontal hole 37 houses the viewing screen 20 and connects at one end with the vertical hole 35 which houses the screen lens 19, the prisms 31 being located at the junction of the two holes 35,37 to direct light from the screen lens onto the screen. The magnifying lens 21 through which the screen 20 can be viewed is mounted on a side face of the block 29 at the other end of the hole 37 which is open at the said face of the block 29.

The disc 18 in which the eccentric ring slit 17 is formed is mounted together with an electric motor 39 in a recess 38 formed in the upper face of the lower block 29. The axis of the vertical hole 36, in which the primary lens 3 and secondary lens 5 are mounted, passes through the recess 38 offset from the centre of the recess so that as the disc 18 rotates the peripheral portions of the disc in which the ring slit 17 is formed pass across the path of light projected along the hole 36. A field lens 40 is inserted just below the disc 18 to ensure that as much light as possible from the primary lens 3 reaches the secondary lens 5. Field lenses 41 are also inserted before the straight line graticules 9,10 to ensure that as much of the reflected light from the graticules as possible passes through the screen lens 19.

The lamp house 23 projects light upwardly towards the primary lens 3 and provides even illumination of the tool tip in the region of the datum point by use of the standard Kohler principle.

As illustrated in FIG. 7, the output from the photomultipliers 15, 16 is fed to a control circuit where it is adjusted by an automatic gain control system 42 and is then put into a Schmitt trigger system 43 so that an output is provided halting the tool drive 44 whenever the signals drop below a predetermined level. In FIG. 6 the X-axis represents the position of a tool tip as it moves across one of the straight slits and the Y-axis represents the corresponding fall in light intensity received by the respective photomultiplier at the point of crossing as a percentage. The line F is representative of the behavior in the case of a focussed image and lines $D_1$ and $D_2$ are representative of the behaviour in the cases of progressively defocussed images. At about a 45 percent reduction in light intensity the height of the image wave form is practically independent of focussing, the lines F, $D_1$ and $D_2$ all intersecting at one point T. By setting the level of the Schmitt trigger system to produce an output below about 55 percent light intensity the effect of tool tip defocussing is thus minimized. Finally steps are taken to eliminate false signals from spurious 'spikes.' Signals from a tool tip are always longer than 1ms in duration, the scanning speed of the eccentric ring slit 17 being arranged accordingly, whereas 'spikes' are generally very much shorter. Hence the circuit is 'slugged' to make it respond only to signals longer than 0.5ms in duration. The details of the construction of the control circuit are not described since they will be obvious to those skilled in the art of automatic machine tool control.

Although the apparatus described above has been described in relation to its use in a numerically controlled lathe it may be applied to any machine tool or adapted for use in other fields in which it is necessary to adjust or monitor the position of a movable member. Further, although the apparatus described above provides for control in two mutually perpendicular directions apparatus embodying the invention may be constructed for the control of movement of a member in any number of directions.

I claim:

1. Means for controlling the relative movement of a member towards a preset datum line, said means comprising an element in which an optical slit is formed, means causing an optical image of the region of said datum line to fall on said slit, with said datum line extending longitudinally of said slit, means scanning said slit along the length thereof, a photo-electric detecting device placed to receive light radiation passing through said slit, an electric circuit connected to said photoelectric device and producing a signal dependent on the light falling thereon, means in said circuit for detecting a momentary drop in said signal indicating a fall in said light radiation caused by the obtrusion of said member into the region of said datum line, and means responsive to said drop for halting said relative movement.

2. Means according to claim 1 wherein said member is relatively movable also in a second direction towards a second present datum line intersecting said first mentioned datum line, said second direction being transverse to the direction of said first mentioned movement, and including means defining a second optical slit extending optically in a direction transverse to said first mentioned slit, said image-causing means causing said image to fall also on said second slit, and said scanning means acting simultaneously to scan said second slit also along the length thereof, a second photoelectric detecting device placed to receive light radiation passing through said second slit, a second electric circuit connected to said second detecting device and producing a second signal dependent on the light falling thereon, means in said second circuit for detecting a momentary drop in said second signal indicating a fall in said light radiation caused by the obtrusion of said member into the region of said second datum line, and means responsive to said last-mentioned drop for halting the relative movement in said second direction.

3. Means according to claim 2 wherein said image-causing means include means defining a first optical path common to both images and extending from the region of intersection of said datum lines to a beam splitting device, and separate second and third optical paths from said beam-splitting device to each of said slits respectively, and wherein said scanning means lie in said first optical path.

4. Means according to claim 3 wherein said scanning means comprise a rotatable member having therein an eccentric slit, said eccentric slit lying in said first optical path in a direction equally inclined to both of said first-mentioned and second slits.

5. Means according to claim 3 wherein said beam-splitting device comprises a cube prism, said first optical path entering said prism in a first cardinal direction and said second and third paths emerging from said prism in second and third cardinal directions.

6. Means according to claim 5 including a viewing screen and a fourth optical path emerging from said prism in a fourth cardinal direction and leading to said screen, whereby said screen displays images of said first-mentioned and second slits.

7. Means according to claim 1 wherein said means for detecting a momentary drop in said signal comprise a Schmitt trigger circuit.

* * * * *